United States Patent
Ichimura

(10) Patent No.: US 10,012,815 B2
(45) Date of Patent: Jul. 3, 2018

(54) PROJECTION OPTICAL SYSTEM AND PROJECTION TYPE DISPLAY APPARATUS USING THE SAME

(71) Applicant: CANON KABUSHIKI KAISHA, Tokyo (JP)

(72) Inventor: Junya Ichimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/249,137

(22) Filed: Aug. 26, 2016

(65) Prior Publication Data
US 2017/0059972 A1 Mar. 2, 2017

(30) Foreign Application Priority Data
Sep. 1, 2015 (JP) ................. 2015-172277

(51) Int. Cl.
*G02B 13/18* (2006.01)
*G02B 7/04* (2006.01)
*G02B 13/16* (2006.01)

(52) U.S. Cl.
CPC ............. *G02B 7/04* (2013.01); *G02B 13/16* (2013.01); *G02B 13/18* (2013.01)

(58) Field of Classification Search
CPC .... G03B 21/28; G03B 21/142; G03B 21/208; G02B 13/12; G02B 13/16; G02B 13/18; G02B 13/22; G02B 15/20; G02B 15/161; G02B 15/163; G02B 15/167; G02B 15/173; G02B 15/177
See application file for complete search history.

(56) References Cited

U.S. PATENT DOCUMENTS

| | | | |
|---|---|---|---|
| 8,400,720 B2 | 3/2013 | Ichimura | |
| 8,654,449 B2 | 2/2014 | Ichimura | |
| 9,261,758 B2 | 2/2016 | Kuwata | |
| 2007/0024983 A1* | 2/2007 | Yamamoto | G02B 13/16 359/649 |
| 2008/0137216 A1* | 6/2008 | Nagatoshi | G03B 21/10 359/714 |
| 2014/0204351 A1* | 7/2014 | Matsuo | G02B 13/16 353/98 |
| 2015/0316755 A1* | 11/2015 | Takemoto | G02B 15/16 359/683 |

FOREIGN PATENT DOCUMENTS

| | | |
|---|---|---|
| JP | 3-196009 A | 8/1991 |
| JP | 2011-145580 A | 7/2011 |
| JP | 2014-202882 A | 10/2014 |

* cited by examiner

*Primary Examiner* — Sultan Chowdhury
(74) *Attorney, Agent, or Firm* — Canon USA Inc., IP Division

(57) ABSTRACT

A projection optical system includes a first lens unit that moves in a direction of an optical axis in adjusting an amount of field curvature and a second lens unit located closer to a reduction side than the first lens unit. The first lens unit includes an aspherical lens satisfying predetermined conditional equations.

38 Claims, 12 Drawing Sheets

FIG.2
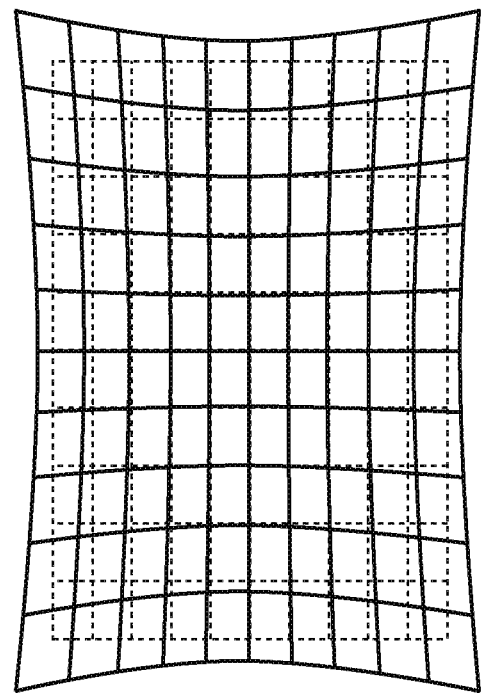
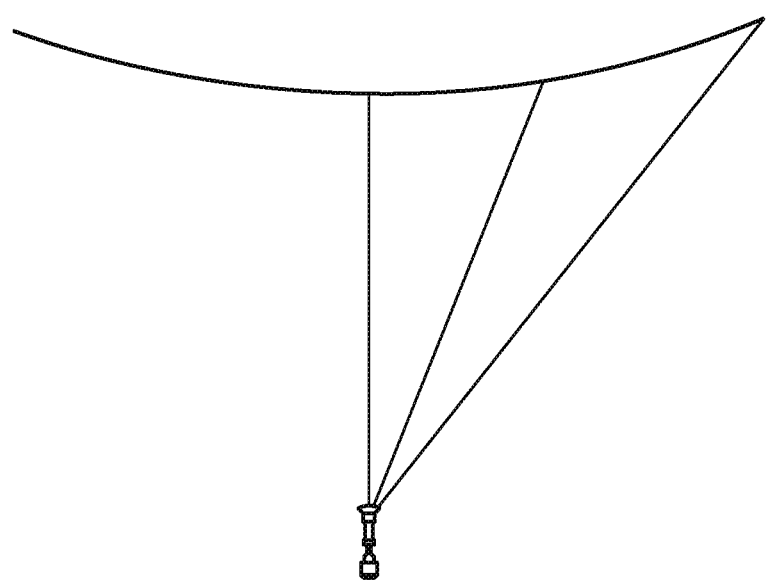

FIG.4
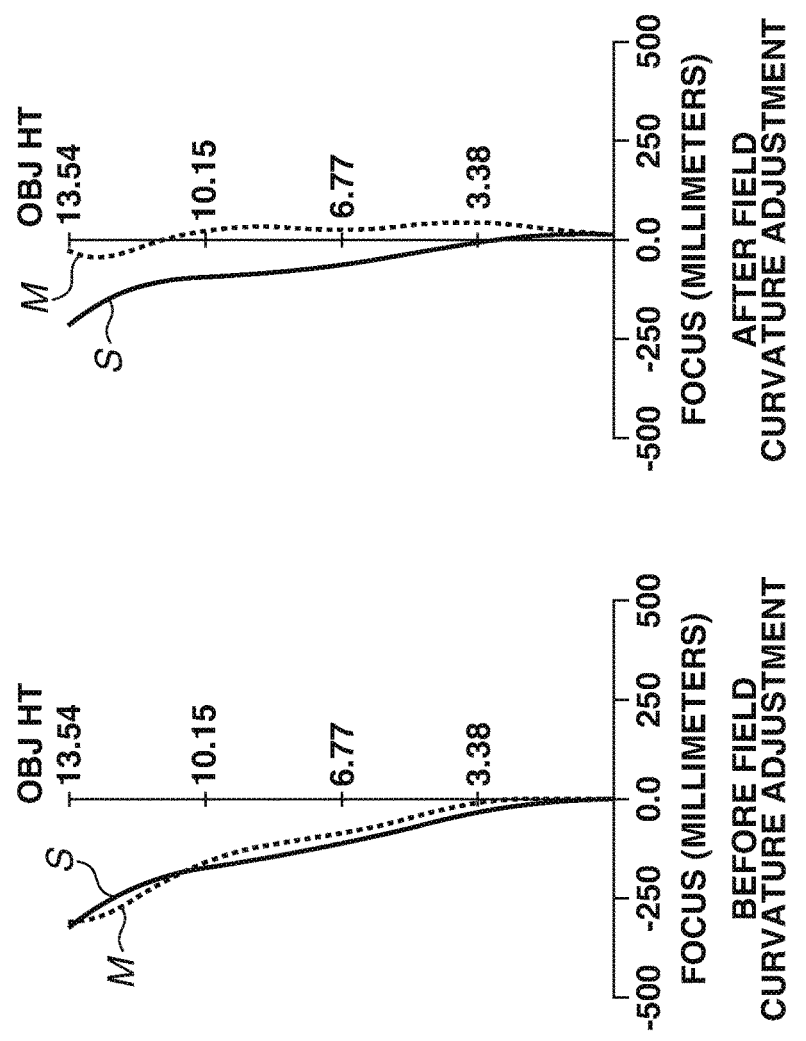
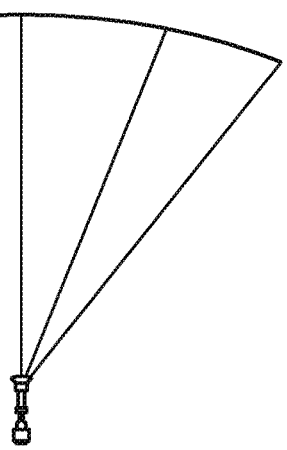

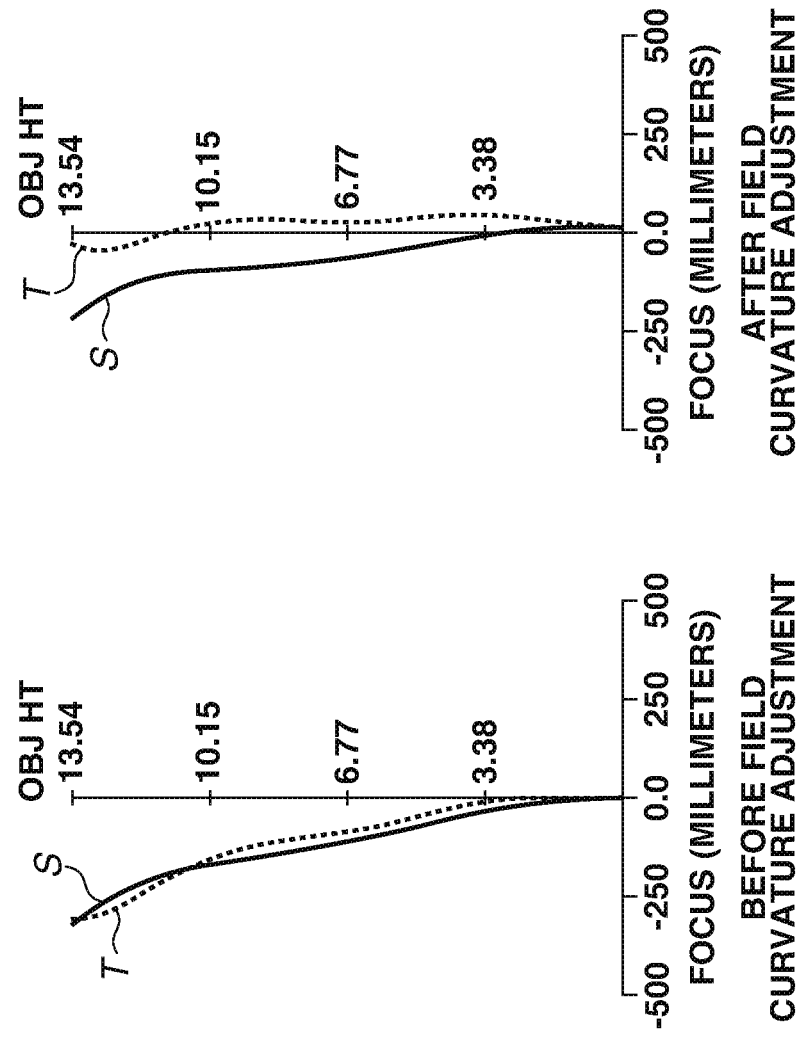
FIG.5
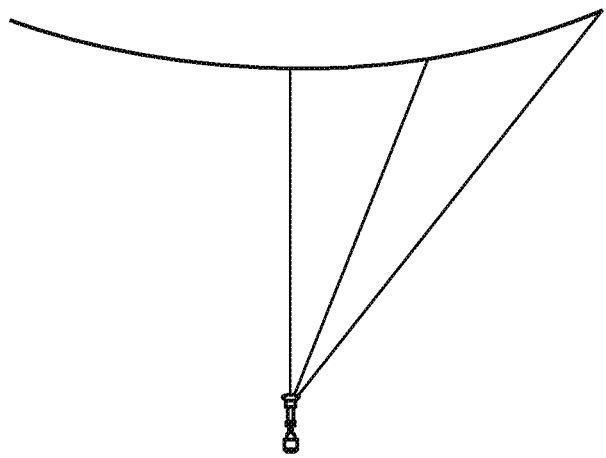

FIG.7
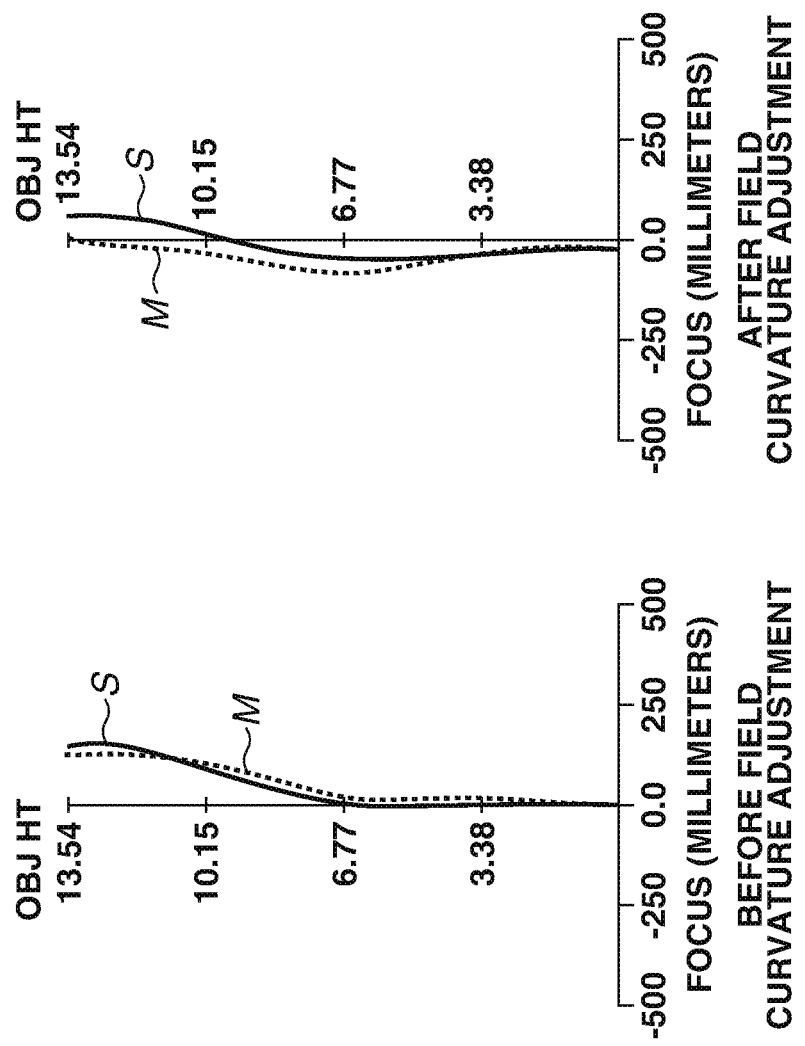
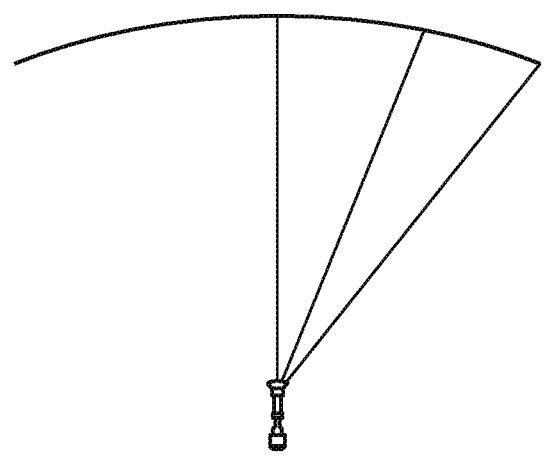

FIG.8
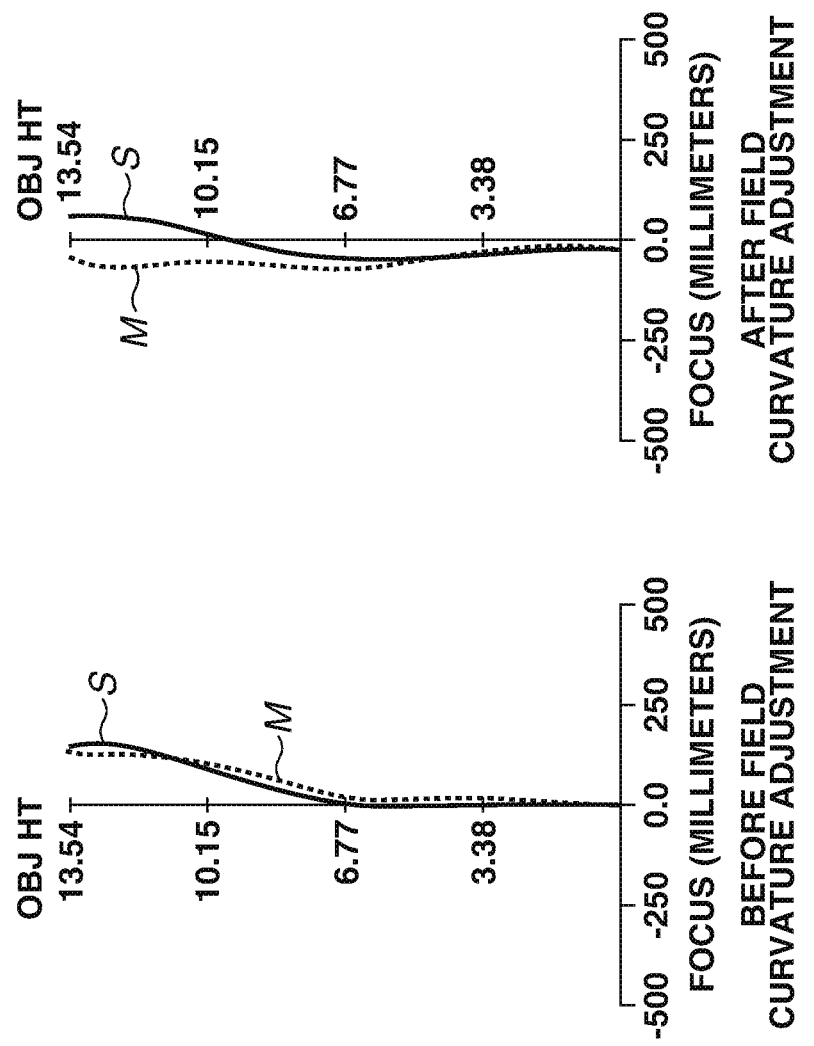
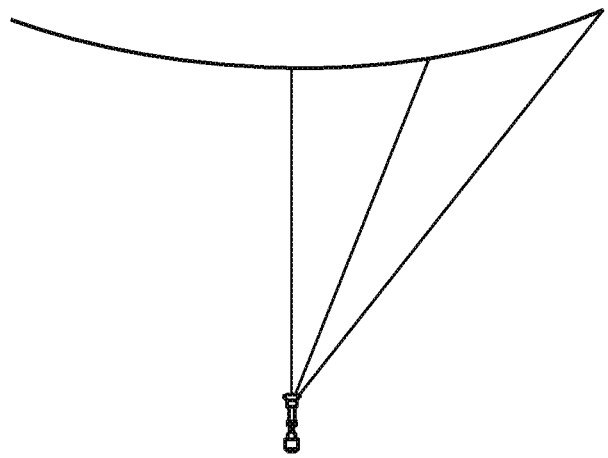

FIG.10
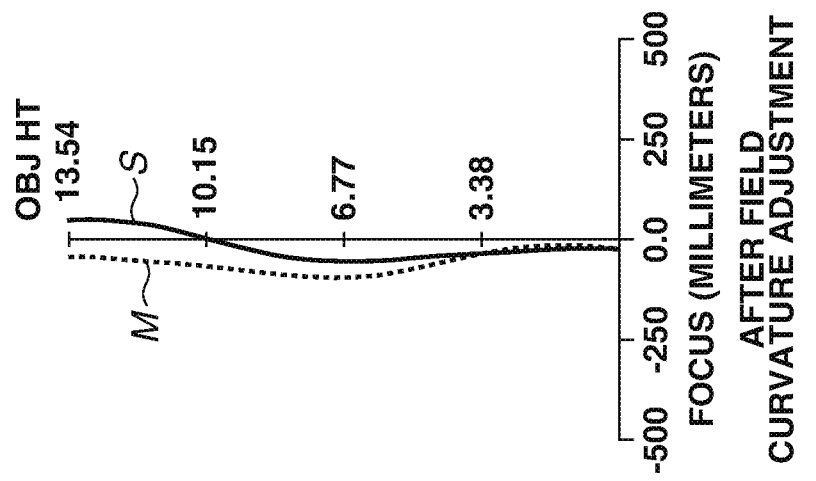
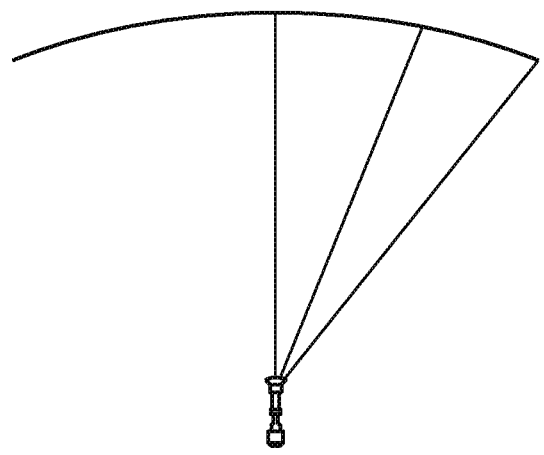

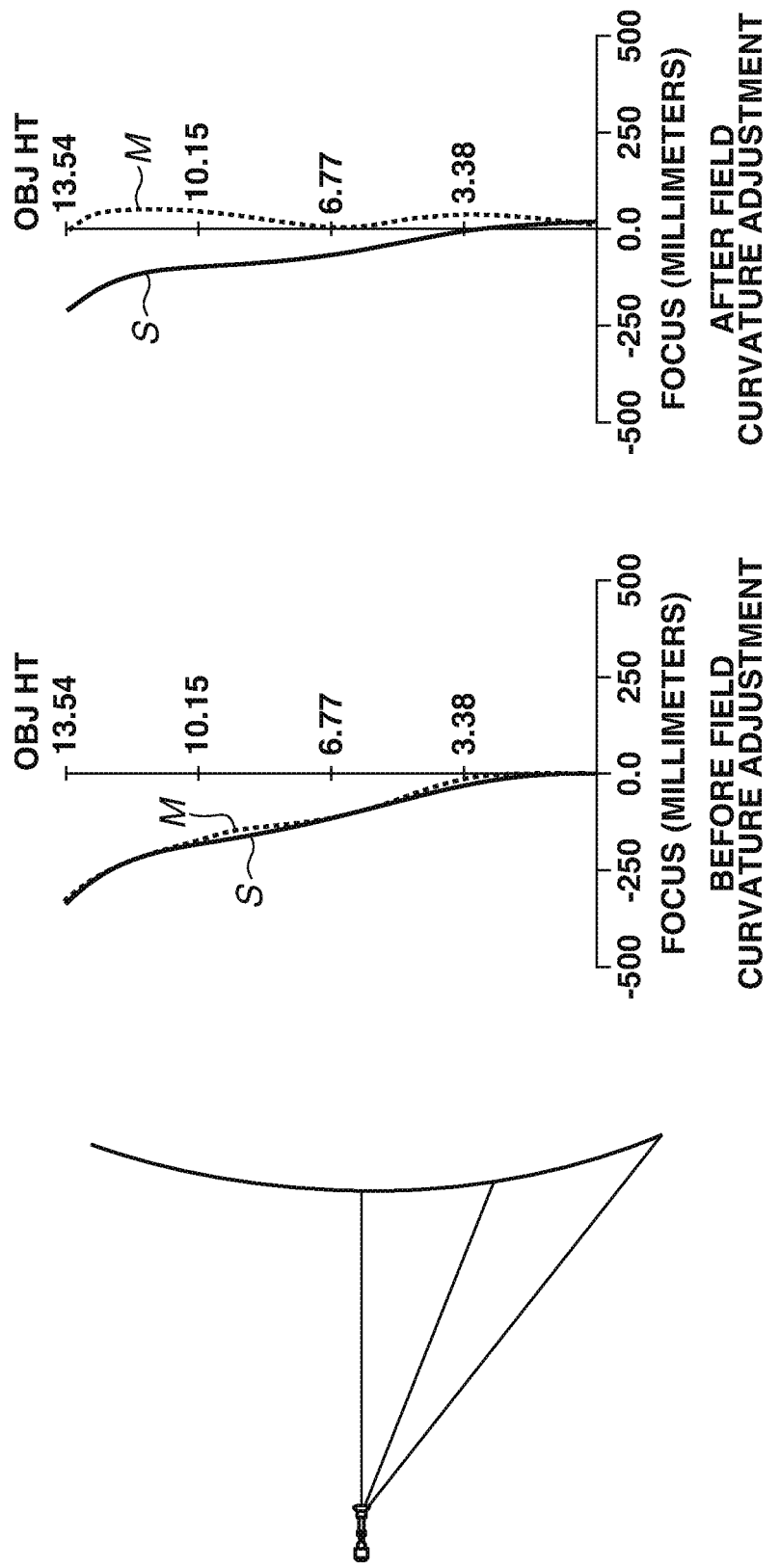

PROJECTION OPTICAL SYSTEM AND PROJECTION TYPE DISPLAY APPARATUS USING THE SAME

BACKGROUND OF THE INVENTION

Field of the Invention

The present invention relates to a projection optical system and a projection type display apparatus using the same.

Description of the Related Art

Recently, a projection type display apparatus that projects an image on a screen having convex or concave portions or a cylindrical curvature or on an object surface having a step has been increased to further enhance a realistic sensation. In a general projector, a projection lens is designed such that its image surface becomes substantially flat to focus on the entire flat screen.

Therefore, in the case where an image is projected on a surface which is not flat such as a screen having a curvature, a focus can be put on the specific position such as the center of the screen similar to the case where an image is projected on a flat surface. However, the other positions are out of focus due to difference of a distance from the flat surface.

As a technique for solving the problem described above, projection lenses discussed in Japanese Patent Application Laid-Open No. 3-196009 and Japanese Patent Application Laid-Open No. 2011-145580 have been known. According to Japanese Patent Application Laid-Open No. 3-196009 and Japanese Patent Application Laid-Open No. 2011-145580, a lens unit is moved according to the average curvature of a screen to purposefully produce field curvature, by which the entire projected image is focused, similar to an image projected on a flat screen, even when an image is projected on a curved screen.

In the case where field curvature adjustment is performed by moving the lens unit as discussed in Japanese Patent Application Laid-Open No. 3-196009 and Japanese Patent Application Laid-Open No. 2011-145580, the phenomenon described below may occur.

That is, depending on the lens unit which is moved to perform the field curvature adjustment, an angle of view is changed due to the movement of the lens unit, which may possibly change the size of the projected image. To address this phenomenon, Japanese Patent Application Laid-Open No. 2011-145580 discusses a technique for adjusting the position of each lens unit through the field curvature adjustment to cancel the change in the angle of view caused by the field curvature adjustment.

However, Japanese Patent Application Laid-Open No. 2011-145580 does not discuss a method for reducing the effect itself produced on the projected image as a result of the field curvature adjustment, such as the change in the angle of view described above.

SUMMARY OF THE INVENTION

The present invention is directed to a projection optical system capable of performing field curvature adjustment which exerts lesser influence on a projected image, and a projection type display apparatus using the same.

According to an aspect of the present invention, a projection optical system includes, a first lens unit that moves in a direction of an optical axis in adjusting an amount of field curvature and a second lens unit located closer to a reduction side than the first lens unit, wherein the first lens unit includes an aspherical lens. When a paraxial radius of curvature of a surface of the aspherical lens at an enlargement side is denoted by R1, an effective diameter is denoted by $\varphi1$, a sagittal amount in a position at a height of $\varphi1/2$ from the optical axis on the surface at the enlargement side is denoted by SAG1, a paraxial radius of curvature of the surface of the aspherical lens at a reduction side is denoted by R2, an effective diameter is denoted by $\varphi2$, and a sagittal amount in a position at a height of $\varphi2/2$ from the optical axis on the surface at the reduction side is denoted by SAG2, the following conditions are satisfied:

$$SR1=\{(\varphi1/2)^2+SAG1^2\}/(2\times SAG1)$$

$$SR2=\{(\varphi2/2)^2+SAG2^2\}/(2\times SAG2)$$

$$1.0<|R1/SR1|/|R2/SR2|\le 5.0.$$

When a focal length of the entire system of the projection optical system is denoted by ftot and a paraxial focal length of the aspherical lens is denoted by fg1, the following condition is satisfied:

$$3<|fg1/ftot|\le 14.50.$$

Further features of the present invention will become apparent from the following description of exemplary embodiments with reference to the attached drawings.

BRIEF DESCRIPTION OF THE DRAWINGS

FIG. 2 illustrates an example of a curved screen convex to a reduction side.

FIG. 4 is an example applied to a curved screen concave to a reduction side according to the first exemplary embodiment.

FIG. 5 is an example applied to a curved screen convex to a reduction side according to the first exemplary embodiment.

FIG. 7 is an example applied to a curved screen concave to a reduction side according to the second exemplary embodiment.

FIG. 8 is an example applied to a curved screen convex to a reduction side according to the second exemplary embodiment.

FIG. 10 is an example applied to a curved screen concave to a reduction side according to the third exemplary embodiment.

FIG. 11 is an example applied to a curved screen convex to a reduction side according to the third exemplary embodiment.

DESCRIPTION OF THE EMBODIMENTS

Common Configuration of Each Exemplary Embodiment

Figure 1:
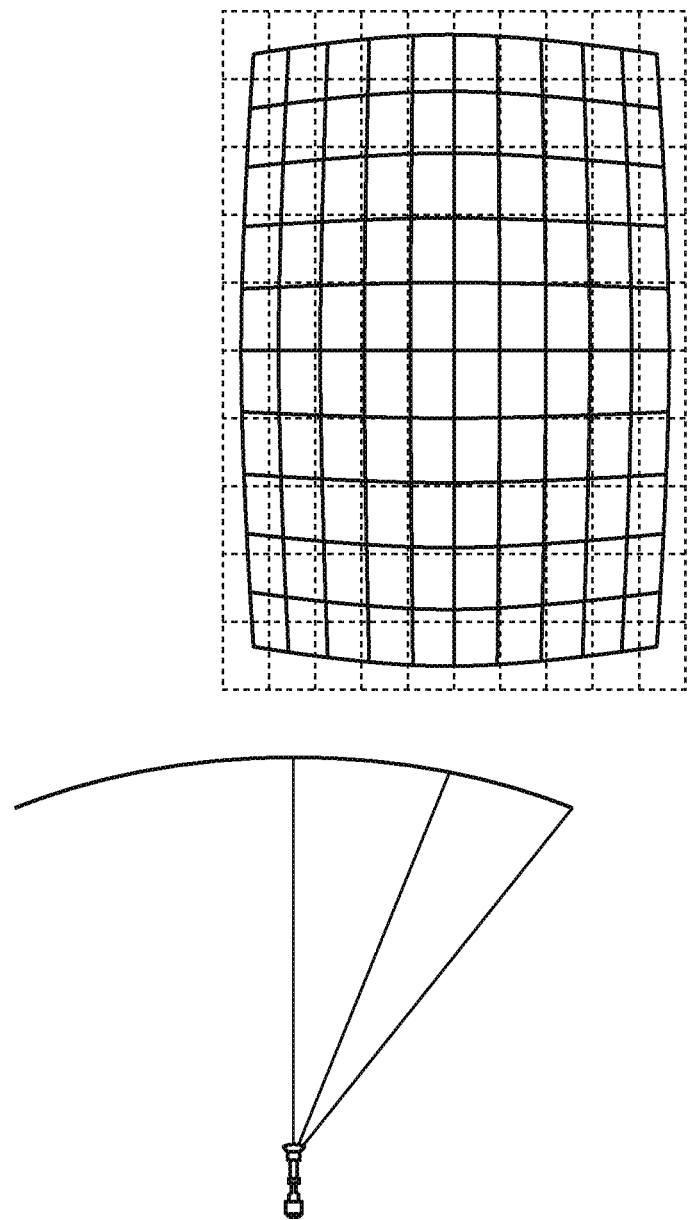
FIG. 1 illustrates an example of a curved screen concave to a reduction side.

Firstly, a configuration common to each of exemplary embodiments of the present invention will be described.

A projection optical system illustrated in each of the exemplary embodiments includes a first lens unit that moves in the direction of an optical axis in adjusting an amount of field curvature and a second lens unit located closer to a reduction side than the first lens unit. The first lens unit includes an aspherical lens in which at least one of the surface at an enlargement side and the surface at the reduction side is aspherical. The aspherical lens described here indicates a lens G1 located closest to the enlargement side (left side in the drawing) in a lens sectional diagram illustrated in FIG. 3, for example.

In each of the exemplary embodiments of the present invention, the lens G1 moves in the direction of the optical axis in the field curvature adjustment. In other words, the first lens unit is composed of the lens G1 (aspherical lens), and the lens G1 is located closest to the enlargement side among optical elements provided in the projection optical system. Naturally, the second or the third lens from the enlargement side can be an aspherical lens having the shape described below.

In a lens unit with a wide angle of view, a lens having strong negative power has to be located at the position closest to the enlargement side or the position close to the enlargement side. Therefore, when this negative lens is moved in the direction of the optical axis, a field curvature can easily be generated, that is, a field curvature can easily be adjusted.

In the case where the negative lens is spherical, it is likely that divergent power of peripheral rays, that is, negative power at a peripheral portion, is excessively increased. Thus, an angle of view is changed due to the movement of the negative lens in the direction of the optical axis for the field curvature adjustment, which might lead to a change in size of a projected image.

In view of this, in each of the exemplary embodiments of the present invention, the lens G1 is an aspherical lens, wherein the shape of the surface at the enlargement side is set such that positive power is increased (or negative power is decreased) toward the periphery from the center of the lens. In other words, the enlargement side is shaped such that the curvature at the peripheral portion of the lens G1 is larger than the paraxial curvature. More desirably, the reduction side is shaped such that negative power is decreased (or positive power is increased) toward the periphery from the center of the lens. In other words, the reduction side is shaped in such a way that the curvature at the peripheral portion of the lens G1 is smaller than the paraxial curvature.

In the configuration described above, the positive power of the surface at the enlargement side is increased at the peripheral portion of the lens G1, whereby the negative power of the whole lens G1 is decreased. When the negative power of the surface at the reduction side is decreased, the negative power of the whole lens G1 is further decreased. In other words, the lens G1 becomes an aspherical lens in which positive power is increased (negative power is decreased) toward the periphery from the center of the lens G1. As a result, the above-described change in the angle of view due to the movement of the lens G1 in the direction of the optical axis for the field curvature adjustment can be reduced.

In other words, the aspherical lens is desirably configured to have the shape described below. Specifically, at least one of the surface at the enlargement side and the surface at the reduction side is desirably configured such that refractive power at a second position which is further away from the optical axis than a first position (in the direction orthogonal to the optical axis) on this surface is smaller than refractive power at the first position.

When attention is focused on not the refractive power of the surface at the enlargement side or the surface at the reduction side but on the refractive power of the whole aspherical lens, the following expression can be applied. Specifically, the first lens unit includes an aspherical lens having a shape in which refractive power at a second position which is further away from the optical axis than a first position (in the direction orthogonal to the optical axis) is smaller than refractive power at the first position. The first position indicates the position where the refractive surface of the aspherical lens and the optical axis cross each other, for example, and the second position indicates an off-axis position on the refractive surface of the aspherical lens.

In order to configure the lens G1 that takes the shape described above, it is desirable that the lens G1 satisfies the following conditions. Specifically, the paraxial curvature radius of the surface of the lens G1 at the enlargement side is denoted by R1, the effective diameter is denoted by $\varphi 1$, and the sagittal amount in the position at a height of $\varphi 1/2$ from the optical axis is denoted by SAG1. Further, the paraxial curvature radius of the surface of the lens G1 at the reduction side is denoted by R2, the effective diameter is denoted by $\varphi 2$, and the sagittal amount in the position at a height of $\varphi 2/2$ from the optical axis is denoted by SAG2.

In this case, the lens G1 desirably satisfies the following equation.

$$SR1=\{(\varphi 1/2)^2 + SAG1^2\}/(2 \times SAG1)$$

$$SR2=\{(\varphi 2/2)^2 + SAG2^2\}/(2 \times SAG2)$$

$$1.0 < |R1/SR1|/|R2/SR2| \leq 5.0 \quad (1a)$$

Alternatively, the lens G1 may have a shape satisfying the following equation instead of the equation (1a) described above.

$$SR1=\{(\varphi 1/2)^2 + SAG1^2\}/(2 \times SAG1)$$

$$|R1/SR1| > 1.0 \quad (1b)$$

Further, it is more desirable that the lens G1 has a shape satisfying the following equation in addition to the equation (1b).

$$SR2=\{(\varphi 2/2)^2 + SAG2^2\}/(2 \times SAG2)$$

$$|R2/SR2| < 1.0 \quad (1c)$$

The numerator of the equation (1a) represents the aspherical degree of the surface of the lens G1 at the enlargement side, while the denominator represents the aspherical degree of the surface of the lens G1 at the reduction side. Specifically, the equation (1a) represents a balance in the aspherical degree between the surface at the enlargement side and the surface at the reduction side, that is, the division of roles of the surface at the enlargement side and the surface at the reduction side. The case where the numerator or the denominator is one means that the surface at the enlargement side or the surface at the reduction side is spherical, and the lower limit value indicates that at least one of the surface at the enlargement side and the surface at the reduction side is aspherical.

As described above, to reduce the occurrence of the change in the angle of view due to the field curvature adjustment, the shape of the surface at the enlargement side is desirably set such that the curvature at the peripheral portion of the lens G1 becomes larger than the paraxial curvature. In addition, the shape of the surface at the reduction side is desirably set such that the curvature at the peripheral portion of the lens G1 becomes smaller than the paraxial curvature. When the surface at the enlargement side is shaped as described above, the value of the numerator of the equation (1a) is increased, and when the surface at the reduction side is shaped as described above, the value of the denominator of the equation (1a) is decreased.

For example, in the case where the surface at the enlargement side is spherical and the surface at the reduction side is shaped such that the curvature at the peripheral portion of the lens G1 becomes larger than the paraxial curvature, the value departs from the lower limit of the equation (1a). In this case, the divergent power (negative power) at the peripheral portion of the surface at the reduction side is excessively increased, therefore not desirable. Further, when the curvature at the peripheral portion of the lens G1 at the enlargement side is larger than the paraxial curvature, the value departs from the upper limit of the equation (1a). In this case, the negative power of the whole lens G1 is excessively decreased, resulting in that the amount of movement of the lens G1 required for the field curvature adjustment is increased, which causes an increase in size of the whole projection optical system, or a wide angle cannot be realized. Thus, this is not desirable.

The equation (1b) is the numerator of the equation (1a), and its lower limit indicates that the surface at the enlargement side is shaped such that the curvature of the peripheral portion of the lens G1 is larger than the paraxial curvature. When the value departs from the lower limit of the equation (1b), positive power cannot be increased at the peripheral portion of the lens G1 surface at the enlargement side, and thus not desirable.

The equation (1c) is the denominator of the equation (1a), and its upper limit indicates that the surface at the reduction side is shaped such that the curvature of the peripheral portion of the lens G1 is smaller than the paraxial curvature. When the value departs from the upper limit of the equation (1c), negative power cannot be decreased at the peripheral portion of the lens G1 surface at the enlargement side, and thus not desirable.

As described above, the lens G1 is shaped such that at least one of the equations (1a), (1b), and (1c) is satisfied. With these means, a projection optical system that enables field curvature adjustment which exerts lesser influence on a projected image while reducing an amount of a change in an angle of view during the field curvature adjustment, and a projection type display apparatus using the same can be provided. Needless to say, the lens G1 may have the shape satisfying both the equations (1b) and (1c). In other words, it is only necessary that at least one of the surface at the enlargement side and the surface at the reduction side is aspherical, and the lens G1 may be shaped such that the surface at the enlargement side is aspherical and the surface at the reduction side is spherical, or the surface at the enlargement side is spherical and the surface at the reduction side is aspherical. Naturally, both surfaces at the enlargement side and the reduction side may be aspherical.

The equations (1a), (1b), and (1c) are desirably set as described below.

$$1.5 \leq |R1/SR1|/|R2/SR2| \leq 4.0 \tag{1a'}$$

$$4.0 \geq |R1/SR1| > 1.0 \tag{1b'}$$

$$0.9 \leq |R2/SR2| < 1.0 \tag{1c'}$$

Further, equations may be set as described below.

$$2.0 \leq |R1/SR1|/|R2/SR2| \leq 3.0 \tag{1a''}$$

$$3.0 \geq |R1/SR1| > 1.0 \tag{1b''}$$

The peripheral portion of the lens G1 has mainly been described so far. Next, the paraxial shape of the lens G1 will be described. The paraxial shape of the lens G1 is desirably configured as described below. Specifically, it is desirable that an equation below is satisfied, when the paraxial focal length of the lens G1 is denoted by fg1, and the focal length of the entire projection optical system is denoted by ftot.

$$|fg1/ftot| > 3 \tag{2}$$

The equation (2) represents the ratio of power between the lens G1 and the entire projection optical system, and the case where the ratio departs from the lower limit means that the paraxial power of the lens G1 is too high. When the paraxial power of the lens G1 is too high, a large defocus on the optical axis occurs in performing the field curvature adjustment. To correct the defocus, some lens units have to be moved in the optical axis direction, or an adjustment mechanism of extending the entire lens is needed. This results in providing the large-sized or complex projection optical system.

Accordingly, the amount of focus movement in performing the field curvature adjustment can be reduced by configuring the lens G1 such that the paraxial focal length is large enough to satisfy the equation (2).

More desirably, the ratio is set within the range of (2').

$$30 > |fg1/ftot| > 7 \tag{2'}$$

In each of the exemplary embodiments, the focal length ftot of the entire system in the equations (2) to (2') is defined as the focal length of the entire system at a wide-angle end, and in this case, the ratio is more desirably set to the range of (2").

$$20 > |fg1/ftot| > 10 \tag{2''}$$

As a matter of course, the focal length ftot of the entire system may be defined as the focal length of the entire system at a telephoto end. In this case, the equation (2) or (2') is desirably satisfied. The focal length of the entire system at the telephoto end in each of the exemplary embodiment according to the present invention is as illustrated in numerical examples described below.

(Configuration of Projector)

Next, the configuration of a projector P on which the projection optical system described in each of the exemplary embodiments of the present invention can be mounted will be described with reference to FIGS. 12A and 12B.

A light source 1 is a light source unit including a high pressure mercury lamp or a solid-state light source such as a laser diode or a light emitting diode (LED), and a fluorescent body, and it emits white light. An illumination optical system 2 includes a first fly-eye lens, a second fly-eye lens, polarization conversion element, and a condenser lens, and guides a light flux from the light source 1 to a color separating/combining system 3 described below. The color separating/combining system 3 includes a dichroic mirror, a polarization beam splitter, and a color combining prism. The color separating/combining system 3 guides light from the illumination optical system 2 to a light modulation element 4, and guides light from the light modulation element 4 to the projection optical system 5.

The light modulation element 4 is a reflection type liquid crystal panel, and includes a panel for blue, a panel for green, and a panel for red. The light modulation element 4 modulates each of blue light, green light, and red light separated by each optical element of the color separating/combining system 3 based on an image signal.

A projection optical system 5, which is the projection optical system described in each of the exemplary embodiments, guides light from the light modulation element 4 through the color separating/combining system 3 to a screen (projected surface) 6. In FIG. 12A, the screen 6 is a curved screen concave to the projector P. The projection optical system 5 includes, in order from the enlargement side to the reduction side, the above-described lens G1 (first lens unit) serving as a field curvature adjustment mechanism, a focusing mechanism (focusing unit) FU, and a zooming mechanism (zooming unit) ZU.

With the configuration described above, the projector P can project an image onto the screen 6. However, the projector P may further have the configuration described below. Specifically, the projector P may include a position adjustment unit 7 that adjusts the position of the lens G1 (first lens unit) in the optical axis direction, and a shape measurement unit that measures the shape of the screen 6 (projected surface). The position adjustment unit 7 may be configured to adjust the position of the lens G1 in the optical axis direction based on the information from the shape measurement unit.

The position adjustment unit 7 is a drive unit that moves the lens G1 in the optical axis direction or a drive control unit that controls the drive unit, for example. The drive unit may have a mechanical configuration such as a cam mechanism for moving the lens G1 in the optical axis direction through an operation on an operation ring by a user, or may be an actuator or the like.

The shape measurement unit indicates an image pickup optical system 8 and an image pickup element 9. The image pickup optical system 8 and the image pickup element 9 are referred to as an image pickup apparatus. The image pickup optical system 8 guides light from the screen 6 to the image pickup element 9 and transmits information from the image pickup element 9 to the position adjustment unit 7, and the position adjustment unit 7 adjusts the position of the lens G1 in the optical axis direction based on this information.

The lens G1 may be configured to adjust the position in the optical axis direction by a manual operation by the user. According to the above configuration, a field curvature suitable for the shape of the screen 6 can automatically be generated according to the shape of the screen 6, so that a load of the user can be reduced.

Figure 12A:
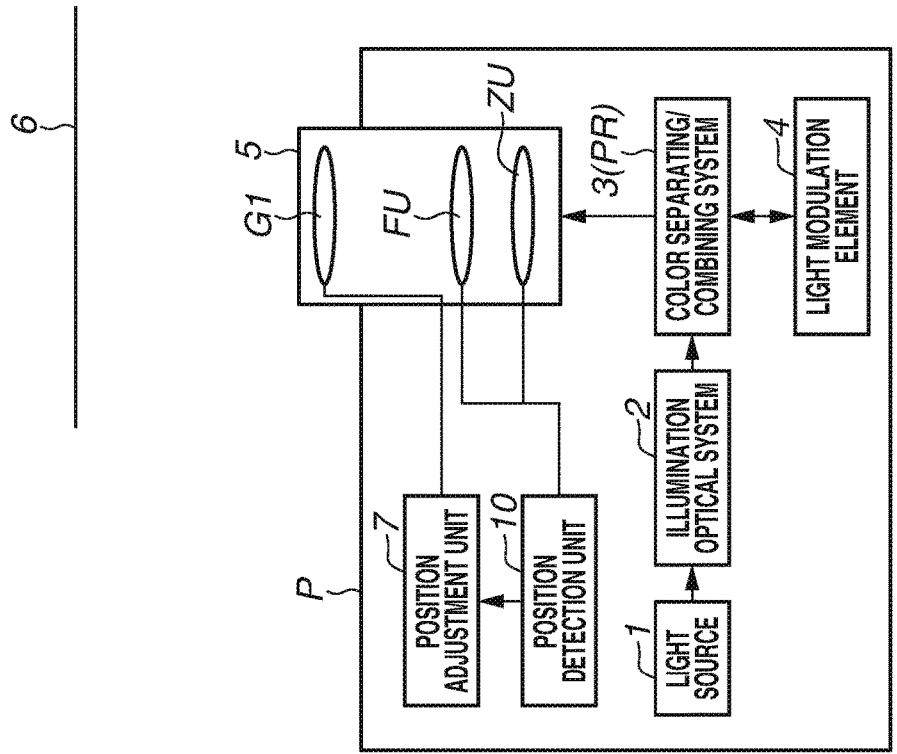
FIGS. 12A and 12B are diagrams illustrating the overview of a projector on which a lens described in each exemplary embodiment can be mounted.

The field curvature adjustment in projecting an image onto a curved screen has been described so far as illustrated in FIG. 12A. However, the lens G1 may be moved in the optical axis direction in projecting an image onto a flat screen as illustrated in FIG. 12B.

As described above, the projection optical system 5 includes, in order from the enlargement side to the reduction side, the above-described lens G1 (first lens unit) serving as a field curvature adjustment mechanism, a focusing mechanism (focusing unit) FU, and a zooming mechanism (zooming unit) ZU. This configuration is desirable, since the field curvature can be independently adjusted in focusing and in zooming. In other words, the second lens unit includes, in order from the enlargement side to the reduction side, the focusing unit that moves in the optical axis direction in focusing and the zooming unit that moves in the optical axis direction in zooming.

When the above condition is satisfied, the lens G1 can be configured as an adjustment unit that can adjust the field curvature while reducing a change in an angle of view. Therefore, it is effective to move the lens G1 also in the case of projecting an image onto a flat screen as illustrated in FIG. 12B. More specifically, for the zooming or focusing, design is performed such that an image surface becomes almost flat at each position (positional relation of a plurality of lens units in the projection optical system). However, an image surface may be slightly deviated from a flat state depending on a position, in the case where higher resolution is demanded. Particularly, it has been known that a large field curvature occurs on a wide-angle lens along with a change in projection distance, and to satisfactorily correct the field curvature, floating focus is used, but the correction may not be satisfactory in some cases.

Figure 12B:
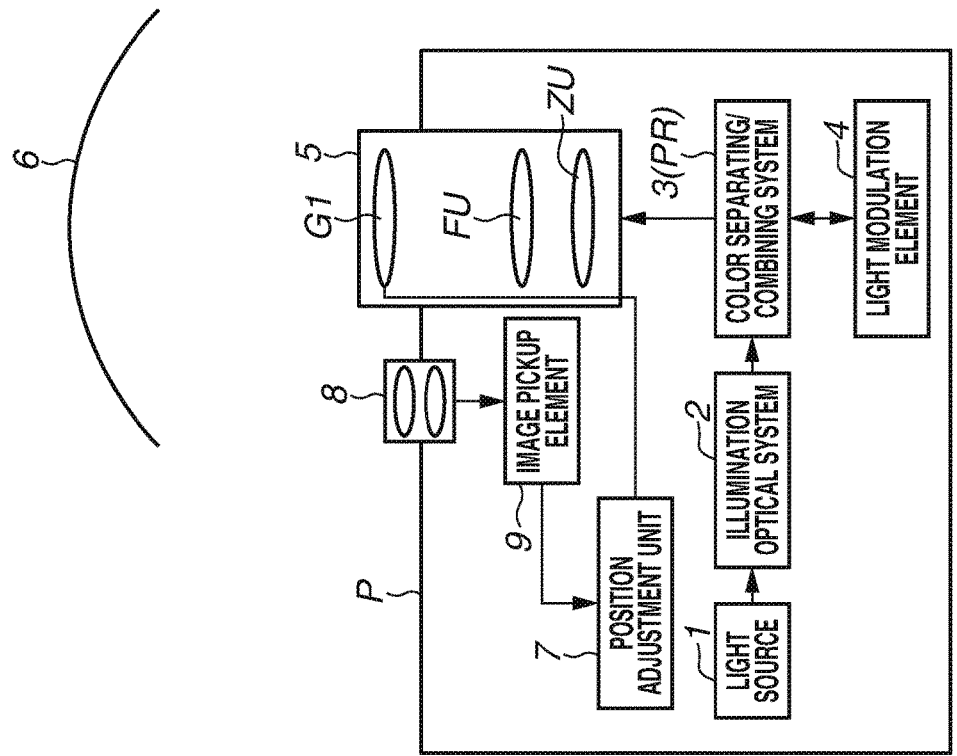

In view of this, as illustrated in FIG. 12B, the position detection unit 10 that detects the position of the zooming unit and the focusing unit is mounted to the projection optical system or the projector, and the lens G1 is automatically adjusted according to information from the position detection unit 10. Thus, the field curvature which remains due to the design problem can be corrected more satisfactorily, whereby more flat image surface characteristic can be obtained. The position detection unit 10 is an encoder, for example.

SR1 in the equations (1a), (1b), and (1c) indicates the radius of the circle that passes through the surface vertex of the lens G1 surface at the enlargement side and a point at a height of $\varphi 1/2$ from the optical axis on the lens G1 surface at the enlargement side. On the other hand, SR2 indicates the radius of the circle that passes through the surface vertex of the lens G1 surface at the reduction side and a point at a height of $\varphi 2/2$ from the optical axis on the lens G1 surface at the reduction side. In other words, SR1 and SR2 indicate the aspherical degree of the shape of the lens G1 at the peripheral portion. The sagittal amounts SAG1 and SAG2 can be obtained from the equation (3) described below.

SR1 can be paraphrased as described below. Specifically, when the spherical surface joining the surface vertex of the lens G1 surface at the enlargement side and the point at a height of $\varphi 1/2$ from the optical axis on the lens G1 surface at the enlargement side is defined as a reference spherical surface, the radius of curvature of this reference spherical surface is SR1. SR2 can also similarly be paraphrased.

In addition, the effective diameter $\varphi 1$ may be the diameter of the surface of the lens G1 at the enlargement side. Alternatively, the effective diameter $\varphi 1$ may be 90% of the diameter of the surface of the lens G1 at the enlargement side, or may be the inner diameter of a holding member holding the lens G1.

In addition, the effective diameter $\varphi 1$ may be twice the length of a line perpendicular to the optical axis from the farthest point from the optical axis, of the points which receive light from the above light modulation element 4, on the lens G1 surface at the enlargement side. Alternatively, the effective diameter $\varphi 1$ may be twice the length of a line perpendicular to the optical axis from the farthest point from the optical axis of the points at which the intensity of light from the above light modulation element 4 is 90% or 50% of the highest intensity, on the lens G1 surface at the enlargement side. The same is applied to the effective diameter φ2.

Other Embodiments

In each of the exemplary embodiments of the present invention, the first lens unit includes the lens G1 and the lens G1 is located closest to the enlargement side out of the optical elements provided to the projection optical system. However, its configuration may be different. For example, a plate glass or a lens having long focal length and low refractive power may be provided closer to the enlargement side than the lens G1.

Further, when the lens G1 is configured as a meniscus lens with a convex surface facing the enlargement side, divergent angles of peripheral rays are difficult to change at the time of the movement in the optical axis direction, so that an unnecessary change in an angle of view can be reduced, which is desirable.

DESCRIPTION OF EACH EXEMPLARY EMBODIMENT

The configuration of each of the exemplary embodiments of the present invention will be described below with reference to the drawings and numerical examples.

FIG. 1 illustrates an example in which an image is projected on a curved screen concave to the reduction side, wherein the projection optical system optimized for a flat screen has the best focus position further to the enlargement side than the screen. This state is referred to as "the focus is in an over-corrected state" (or "the focus is in an over state") in each of the exemplary embodiments of the present invention.

FIG. 2 illustrates an example in which an image is projected on a curved screen convex to the reduction side, wherein the projection optical system optimized for a flat screen has the best focus position which is closer to the reduction side than the screen. This state is referred to as "the focus is in an under-corrected state" (or "the focus is in an under state") in each of the exemplary embodiments of the present invention.

In the states illustrated in FIGS. 1 and 2, the projected image on the screen is distorted according to the curved degree of the screen as described above, and an out-of-focus state is generated according to the amount of distortion. Therefore, if the projection optical system optimized for the flat screen is used as it is, a satisfactory image cannot be obtained. Further, in the state illustrated in FIG. 1, the distance of the projected surface is shorter than the flat surface, so that the projected surface is deformed into a barrel shape, and in the state illustrated in FIG. 2, the projected surface is deformed into a bobbin shape.

The projection optical system described in each of the exemplary embodiments of the present invention eliminates such distortion by moving the lens G1 in the optical axis direction. The out-of-focus amount according to the amount of distortion may be determined by shooting and measuring the distortion of an image on the projected surface illustrated in FIGS. 1 and 2 by the image pickup apparatus as described above.

Figure 3:
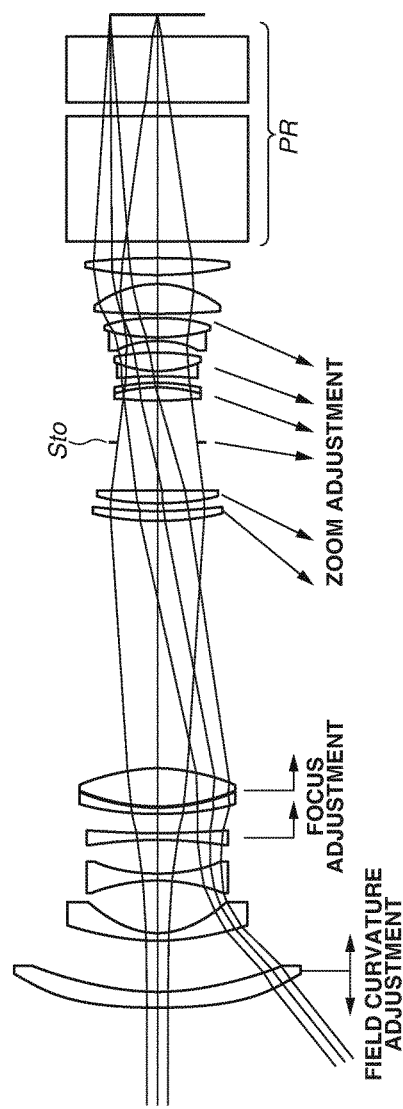
FIG. 3 is a sectional view of lens at a wide-angle end according to a first exemplary embodiment.
Figure 6:
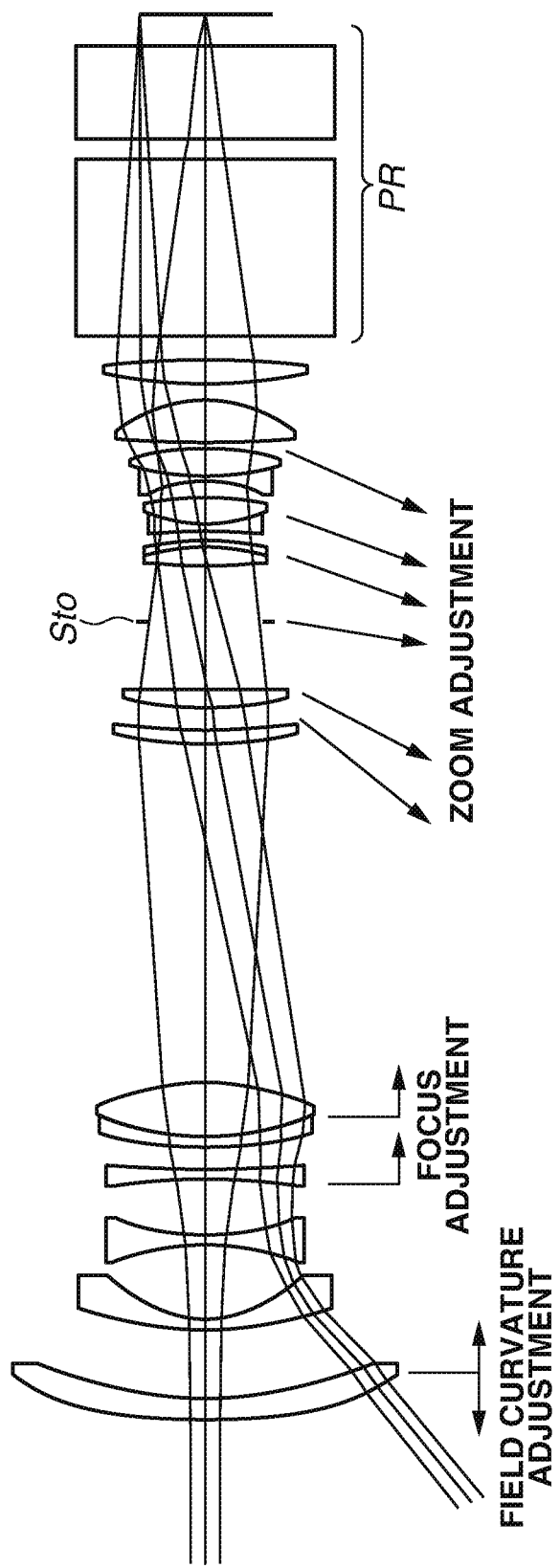
FIG. 6 is a sectional view of lens at a wide-angle end according to a second exemplary embodiment.
Figure 9:
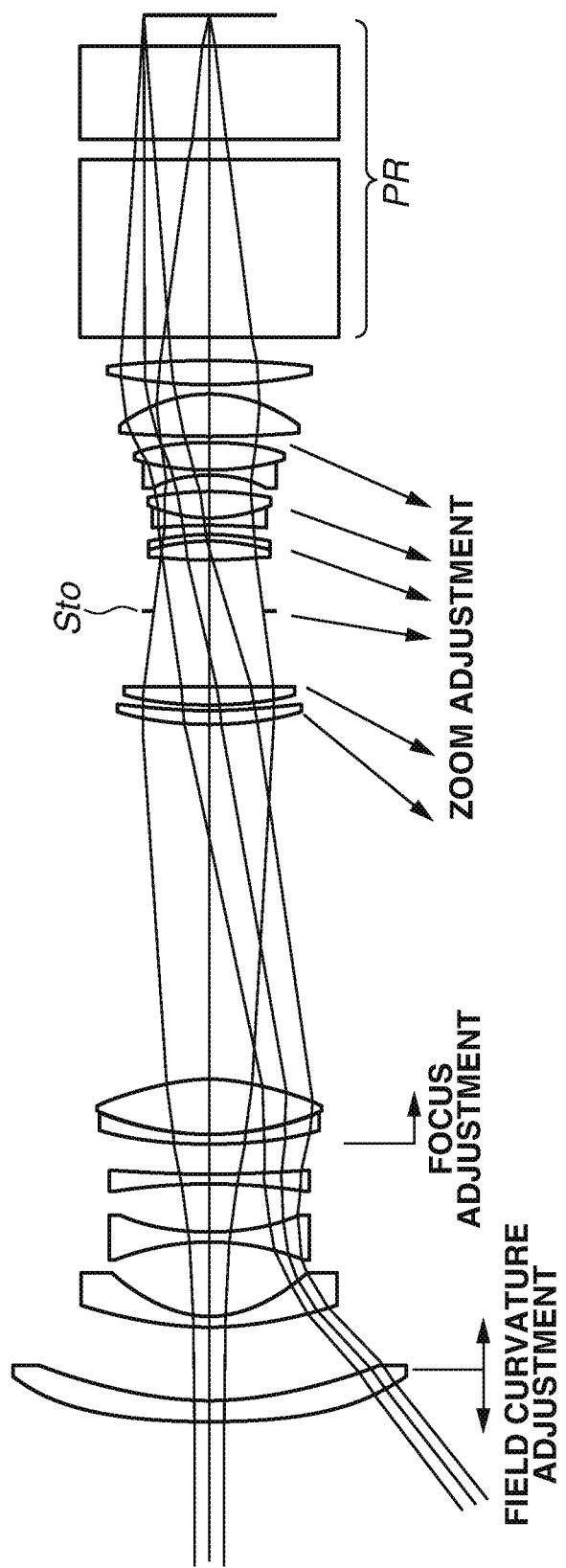
FIG. 9 is a sectional view of lens at a wide-angle end according to a third exemplary embodiment.

FIGS. 3, 6, and 9 are sectional views of lens at a wide-angle end according to each of the exemplary embodiments. Each of the projection optical systems is designed mainly for a projector, and includes a prism glass PR disposed closest to the reduction side. The prism glass PR is a polarization beam splitter or a color combining prism provided to the above-described color separating/combining system 3.

FIGS. 4, 5, 7, 8, 10, and 11 are astigmatism diagrams in each of the exemplary embodiments. In each diagram, a solid line indicates a sagittal image plane and a dotted line indicates a meridional image plane. A horizontal axis indicates an out-of-focus amount on the screen with a scale of −500 to +500 [mm]. Each diagram also illustrates a focus movement on the optical axis.

The sectional view of lens at a wide-angle end according to the first exemplary embodiment of the present invention is illustrated in FIG. 3.

In the first exemplary embodiment, a negative meniscus lens with a convex surface facing the enlargement side is disposed closest to the enlargement side, wherein the surface (R1) at the enlargement side is aspherical and the surface (R2) at the reduction side is spherical.

The aspherical lens may be restricted such that only one surface is aspherical from the viewpoint of the manufacture thereof. Even in this case, the change in the angle of view in the field curvature adjustment can be reduced, when the equation (1a) or (1b) is satisfied.

The left diagram in FIG. 4 illustrates the astigmatism diagram on a screen, which is concave to the reduction side and has R=3 m, when an image is projected on the screen according to the first exemplary embodiment. The right diagram illustrates an example in which adjustment by 0.3 mm toward the enlargement side is performed so as to cause a field curvature to change to be under-corrected. It is understood from FIG. 4 that the field curvature is adjustable with less defocusing on the optical axis, and a more satisfactory image can be obtained than before the adjustment, by adjusting the field curvature with respect to the curved screen concave to the reduction side.

The left diagram in FIG. 5 illustrates the astigmatism diagram on a screen which is convex to the reduction side and has R=4 m, when an image is projected on the screen according to the first exemplary embodiment. The right diagram illustrates an example in which adjustment by 0.3 mm toward the enlargement side is performed so as to cause a field curvature to change to over-corrected. It is understood from FIG. 5 that the field curvature is adjustable with less defocusing on the optical axis, and a more satisfactory image can be obtained than before the adjustment, by adjusting the field curvature with respect to the curved screen convex to the reduction side.

As described above, the present exemplary embodiment can provide a projection optical system capable of performing field curvature adjustment which exerts lesser influence on a projected image, regardless of whether the screen concave to the reduction side or the screen convex to the reduction side is used, and provide a projection type display apparatus using the same.

The sectional view of lens at a wide-angle end according to the second exemplary embodiment of the present invention is illustrated in FIG. 6.

In the second exemplary embodiment, a negative meniscus lens with a convex surface facing the enlargement side is disposed closest to the enlargement side, wherein both the surface (R1) at the enlargement side and the surface (R2) at the reduction side are aspherical in which positive power is increased toward the peripheral portion from the center of the lens.

The left diagram in FIG. 7 illustrates the astigmatism diagram on a screen, which is concave to the reduction side and has R=3 m, when an image is projected on the screen according to the second exemplary embodiment. The right diagram illustrates an example in which adjustment by 0.3 mm toward the enlargement side is performed so as to cause a field curvature to change to under-corrected. It is understood from FIG. 7 that the field curvature is adjustable with less defocusing on the optical axis, and a more satisfactory image can be obtained than before the adjustment by adjusting the field curvature with respect to the curved screen concave to the reduction side.

The left diagram in FIG. 8 illustrates the astigmatism diagram on a screen, which is convex to the reduction side and has R=4 m, when an image is projected on the screen according to the second exemplary embodiment. The right diagram illustrates an example in which adjustment by 0.35 mm toward the enlargement side is performed so as to cause a field curvature to change to over-corrected. It is understood from FIG. 8 that the field curvature is adjustable with less defocusing on the optical axis, and a more satisfactory image can be obtained than before the adjustment by adjusting the field curvature with respect to the curved screen convex to the reduction side.

As described above, the present exemplary embodiment can provide a projection optical system capable of performing field curvature adjustment which exerts lesser influence on a projected image, regardless whether the screen concave to the reduction side or the screen convex to the reduction side is used, and provide a projection type display apparatus using the same.

The sectional view of lens at a wide-angle end according to the third exemplary embodiment of the present invention is illustrated in FIG. 9.

The third exemplary embodiment shows the example in which the number of focus adjustment units in the second exemplary embodiment is decreased and performance of the remaining field curvature caused by the distance variation, is compensated by the fine adjustment of the position of the lens G1 in the optical axis direction.

In the third exemplary embodiment, the field curvature remaining at the closest distance side in a direction of the over-corrected state is compensated by moving the lens G1 toward the enlargement side and generating the under-corrected field curvature. In so-called floating focus, variation in focus caused by the adjustment of field curvature is compensated by extending an entire lens. However, this method needs a mechanical mechanism having high rigidity accompanied by high resolution and increase in lens weight, and thus is not desirable.

In view of this, if two units are moved and the variation in focus and the degree of the field curvature are adjusted while canceling the variation in focus on the optical axis and in the degree of the field curvature as in the first exemplary embodiment, the weight of the moving lens units is decreased to achieve high optical performance.

On the other hand, in the method according to the third exemplary embodiment, a mechanism for generating variation in focus on the optical axis and a mechanism for changing only a field curvature without changing the focus on the optical axis are separated. By separating the functions, not only the focusing configuration can be simplified, but also the adjustment with respect to a curved screen and the reduction in an occurrence of unnecessary field curvature when back focus is shifted after assembling the lens units, can be achieved.

The left diagram in FIG. 10 illustrates the astigmatism diagram on a screen, which is concave to the reduction side and has R=3 m, when an image is projected on the screen according to the third exemplary embodiment. The right diagram illustrates an example in which adjustment by 0.3 mm toward the enlargement side is performed so as to cause a field curvature to change to under-corrected. It is understood from FIG. 10 that the field curvature is adjustable with less defocusing on the optical axis, and a more satisfactory image than before the adjustment can be obtained by adjusting the field curvature with respect to the curved screen concave to the reduction side.

The left diagram in FIG. 11 illustrates the astigmatism diagram on a screen, which is convex to the reduction side and has R=4 m, when an image is projected onto the screen according to the third exemplary embodiment. The right diagram illustrates an example in which adjustment by 0.35 mm toward the enlargement side is performed so as to cause a field curvature to change to over-corrected. It is understood from FIG. 11 that the field curvature is adjustable with less defocusing on the optical axis, and a more satisfactory image than before the adjustment can be obtained by adjusting the field curvature with respect to the curved screen convex to the reduction side.

As described above, the present exemplary embodiment can provide a projection optical system capable of performing field curvature adjustment which exerts lesser influence on a projected image, regardless of whether the screen concave to the reduction side or the screen convex to the reduction side is used, and provide a projection type display apparatus using the same.

NUMERICAL EXAMPLES

Numerical examples of the respective exemplary embodiments will be described below. A surface number is a number sequentially attached to a surface of each lens from the enlargement side, φea represents an effective diameter of each lens, R represents a curvature radius of each lens surface, d represents a surface interval, and Nd and vd represent refractive index and Abbe number of a glass material with respect to the d-line (587.56 nm). The lens surface marked with s at the right of the surface number represents an aperture stop. The lens surface marked with * (asterisk) at the right of the surface number is aspherical. When y is a coordinate in the diameter direction with the surface vertex of the lens surface being used as a reference, and x is the above-described sagittal amounts SAG1 and SAG2, the aspherical shape is represented by the following equation as the coordinate in the optical axis direction when the surface vertex of the lens surface is defined as a reference.

$$x = (y^2/R)/[1+\{1-(1+k)(y^2/R^2)\}^{1/2}] + Ay^4 + By^6 + Cy^8 + Dy^{10} + Ey^{12} + Fy^{14} + Gy^{16} \quad (3)$$

The radius of curvature R in the equation (3) represents the paraxial radius of curvatures R1 and R2 described above for an aspherical lens. To obtain paraxial radius of curvatures R1 and R2 of an aspherical lens, the surface shape of the aspherical lens is measured, and the shape same as the surface shape may be reproduced by using optical design software according to the equation (3).

In addition, in each of the numerical examples described below, the surface interval referred to as (variable) represents a surface interval that changes in at least one of zooming and focusing. A zoom interval is the data when the projection distance is 1534 mm, and a focus interval is the data at a wide-angle end.

Numerical Example 1

| f = 17.07–22.18 ω = 38.3–31.3 FNO = 2.6 Φ = 27.08 | | | | | | |
|---|---|---|---|---|---|---|
| SUR | Φea | | | | | |
| OBJ | 1534.00 | R | d | GLASS | Nd | υd |
| 1* | 76.00 | 227.8794 | 4.35 | SBSL7 | 1.51633 | 64.14 |
| 2 | 69.89 | 79.9850 | 15.00 | | | |
| 3* | 49.38 | 66.8497 | 2.60 | SLAL8 | 1.71300 | 53.87 |
| 4 | 40.28 | 27.5965 | 15.70 | | | |
| 5 | 37.87 | −52.8286 | 2.00 | SFPL51 | 1.49700 | 81.54 |
| 6 | 36.47 | 50.8683 | (VARIABLE) | | | |
| 7 | 37.62 | −122.2170 | 2.00 | SLAM2 | 1.74400 | 44.79 |
| 8 | 38.55 | 243.6367 | (VARIABLE) | | | |
| 9 | 41.99 | 100.5865 | 2.30 | EFDS1W | 1.92286 | 20.88 |
| 10 | 42.37 | 58.3826 | 11.20 | SNBH52 | 1.67300 | 38.15 |
| 11 | 43.08 | −53.5108 | (VARIABLE) | | | |
| 12 | 37.07 | 72.7271 | 3.30 | SBAL35 | 1.58913 | 61.13 |
| 13 | 36.50 | 140.7457 | (VARIABLE) | | | |
| 14 | 31.58 | 76.0349 | 3.60 | FD60W | 1.80518 | 25.46 |
| 15 | 31.03 | 1029.7681 | (VARIABLE) | | | |
| 16s | 22.93 | INF | (VARIABLE) | | | |
| 17 | 22.54 | 450.5117 | 3.70 | SBSL7 | 1.51633 | 64.14 |
| 18 | 22.20 | −40.2807 | 1.30 | TAFD25 | 1.90366 | 31.31 |
| 19 | 22.18 | −68.5657 | (VARIABLE) | | | |
| 20 | 21.34 | −352.9245 | 1.20 | TAFD25 | 1.90366 | 31.31 |
| 21 | 21.50 | 28.6885 | 5.90 | SBSL7 | 1.51633 | 64.14 |
| 22 | 22.34 | −48.2408 | (VARIABLE) | | | |
| 23 | 22.98 | −26.0376 | 1.30 | TAFD25 | 1.90366 | 31.31 |
| 24 | 26.09 | 77.5206 | 5.75 | SBSL7 | 1.51633 | 64.14 |
| 25 | 28.42 | −48.1230 | 1.16 | | | |
| 26 | 32.66 | 267.1779 | 8.75 | SFPL51 | 1.49700 | 81.54 |
| 27 | 34.46 | −30.1637 | (VARIABLE) | | | |
| 28 | 39.48 | 89.1406 | 5.00 | SNPH1 | 1.80809 | 22.76 |
| 29 | 39.36 | −223.9052 | 5.00 | | | |
| 30 | 50.00 | INF | 37.00 | SBSL7 | 1.51633 | 64.14 |
| 31 | 50.00 | INF | 4.00 | | | |
| 32 | 50.00 | INF | 19.50 | SF6 | 1.80518 | 25.43 |
| 33 | 50.00 | INF | 6.96 | | | |

| Aspherical coefficient | | |
|---|---|---|
| IMG SUR | 1* | 3* |
| R | 227.8794 | 66.8497 |
| k | 0 | 0 |
| A | 3.2232E−06 | −3.0924E−06 |
| B | −1.2520E−09 | 9.5440E−10 |
| C | 7.7393E−13 | 9.4330E−13 |
| D | −2.6304E−16 | −1.7525E−15 |
| E | 5.8680E−20 | 8.9021E−19 |

| Zoom interval | | | |
|---|---|---|---|
| SUR | WIDE | MIDDLE | TELE |
| 11 | 69.726 | 52.162 | 34.853 |
| 13 | 4.096 | 10.012 | 18.450 |
| 15 | 14.458 | 21.250 | 26.982 |
| 16 | 11.941 | 7.578 | 1.500 |
| 19 | 2.000 | 2.000 | 4.855 |
| 22 | 3.351 | 4.287 | 4.092 |
| 27 | 2.078 | 10.362 | 16.920 |

| Focus interval | | | |
|---|---|---|---|
| SUR OBJ | 1096 | 1534 | 6576 |
| 6 | 12.911 | 11.766 | 9.804 |
| 8 | 4.000 | 4.473 | 5.284 |
| 11 | 69.054 | 69.726 | 70.878 |

Numerical Example 2

| f = 17.07–22.18 ω = 38.3–31.3 FNO = 2.6 Φ = 27.08 ||||||
|---|---|---|---|---|---|
| SUR | Φea | | | | |
| OBJ | 1534.00 | R | d | GLASS | Nd | υd |
| 1* | 76.36 | 246.1596 | 4.50 | SBSL7 | 1.51633 | 64.14 |
| 2* | 70.48 | 83.6007 | 14.00 | | | |
| 3* | 49.13 | 59.9509 | 2.60 | SLAL8 | 1.71300 | 53.87 |
| 4 | 40.31 | 27.8248 | 15.00 | | | |
| 5 | 38.06 | −52.6424 | 2.00 | SFPL51 | 1.49700 | 81.54 |
| 6 | 36.17 | 47.3397 | (VARIABLE) | | | |
| 7 | 36.94 | −107.4611 | 2.00 | SLAM2 | 1.74400 | 44.79 |
| 8 | 37.88 | 204.0220 | (VARIABLE) | | | |
| 9 | 41.25 | 98.0378 | 2.30 | EFDS1W | 1.92286 | 20.88 |
| 10 | 41.59 | 56.2035 | 11.20 | SNBH52 | 1.67300 | 38.15 |
| 11 | 42.31 | −51.8320 | (VARIABLE) | | | |
| 12 | 35.42 | 73.4648 | 3.30 | SBAL35 | 1.58913 | 61.13 |
| 13 | 34.81 | 128.6670 | (VARIABLE) | | | |
| 14 | 31.63 | 71.7142 | 3.60 | FD60W | 1.80518 | 25.46 |
| 15 | 31.10 | 1187.4460 | (VARIABLE) | | | |
| 16s | 22.92 | INF | (VARIABLE) | | | |
| 17 | 22.52 | 435.2147 | 3.70 | SBSL7 | 1.51633 | 64.14 |
| 18 | 22.19 | −40.3754 | 1.30 | TAFD25 | 1.90366 | 31.31 |
| 19 | 22.22 | −66.7994 | (VARIABLE) | | | |
| 20 | 21.42 | −196.5375 | 1.20 | TAFD25 | 1.90366 | 31.31 |
| 21 | 21.39 | 29.1918 | 5.90 | SBSL7 | 1.51633 | 64.14 |
| 22 | 21.98 | −44.7197 | (VARIABLE) | | | |
| 23 | 22.41 | −25.4053 | 1.30 | TAFD25 | 1.90366 | 31.31 |
| 24 | 25.36 | 76.0061 | 5.75 | SBSL7 | 1.51633 | 64.14 |
| 25 | 27.70 | −44.9881 | 1.16 | | | |
| 26 | 31.95 | 261.3289 | 8.75 | SFPL51 | 1.49700 | 81.54 |
| 27 | 33.84 | −29.8326 | (VARIABLE) | | | |
| 28 | 39.08 | 86.3781 | 5.00 | SNPH1 | 1.80809 | 22.76 |
| 29 | 38.94 | −247.1264 | 5.00 | | | |
| 30 | 50.00 | INF | 37.00 | SBSL7 | 1.51633 | 64.14 |
| 31 | 50.00 | INF | 4.00 | | | |
| 32 | 50.00 | INF | 19.50 | SF6 | 1.80518 | 25.43 |
| 33 | 50.00 | INF | 6.96 | | | |

Aspherical coefficient

| IMG SUR | 1* | 2* | 3* |
|---|---|---|---|
| R | 246.1596 | 83.6007 | 59.9509 |
| k | 0 | 0 | 0 |
| A | 3.0758E−06 | −4.3043E−07 | −3.2787E−06 |
| B | −1.3371E−09 | −7.5145E−11 | 5.6279E−10 |
| C | 7.7489E−13 | 4.6711E−14 | 1.4073E−12 |
| D | −2.6181E−16 | 5.4000E−17 | −1.3655E−15 |
| E | 5.6306E−20 | −1.8280E−20 | 4.3028E−19 |

Zoom interval

| SUR | WIDE | MIDDLE | TELE |
|---|---|---|---|
| 11 | 70.017 | 52.272 | 33.214 |
| 13 | 4.662 | 10.552 | 20.951 |
| 15 | 13.959 | 20.722 | 26.339 |
| 16 | 12.125 | 7.871 | 1.500 |
| 19 | 2.000 | 2.000 | 5.300 |
| 22 | 3.226 | 4.055 | 3.408 |
| 27 | 2.962 | 11.479 | 18.239 |

Focus interval

| SUR | | | |
|---|---|---|---|
| OBJ | 1096 | 1534 | 6576 |
| 6 | 13.196 | 12.086 | 10.167 |
| 8 | 4.000 | 4.402 | 5.098 |
| 11 | 69.310 | 70.017 | 71.241 |

Numerical Example 3

| f = 17.07–22.19 ω = 38.3–31.3 FNO = 2.6 Φ = 27.08 | | | | | | |
|---|---|---|---|---|---|---|
| SUR | Φea | | | | | |
| OBJ | 1534.00 | R | d | GLASS | Nd | υd |
| 1* | 77.74 | 281.0701 | 4.50 | SBSL7 | 1.51633 | 64.14 |
| 2* | 71.94 | 89.9997 | (VARIABLE) | | | |
| 3* | 50.14 | 69.5903 | 2.60 | SLAL8 | 1.71300 | 53.87 |
| 4 | 40.87 | 28.1980 | 15.00 | | | |
| 5 | 39.21 | −50.3240 | 2.00 | SFPL51 | 1.49700 | 81.54 |
| 6 | 37.81 | 54.6731 | (VARIABLE) | | | |
| 7 | 38.53 | −162.0133 | 2.00 | SLAM2 | 1.74400 | 44.79 |
| 8 | 39.33 | 170.5988 | (VARIABLE) | | | |
| 9 | 43.09 | 111.3648 | 2.30 | EFDS1W | 1.92286 | 20.88 |
| 10 | 43.34 | 62.4022 | 11.20 | SNBH52 | 1.67300 | 38.15 |
| 11 | 43.95 | −54.5630 | (VARIABLE) | | | |
| 12 | 35.79 | 67.2229 | 3.30 | SBAL35 | 1.58913 | 61.13 |
| 13 | 35.39 | 139.6246 | (VARIABLE) | | | |
| 14 | 33.09 | 82.4854 | 3.60 | FD60W | 1.80518 | 25.46 |
| 15 | 32.49 | 3012.0525 | (VARIABLE) | | | |
| 16 | 22.61 | INF | (VARIABLE) | | | |
| 17 | 22.37 | 1e+004 | 3.70 | SBSL7 | 1.51633 | 64.14 |
| 18 | 22.23 | −37.3030 | 1.30 | TAFD25 | 1.90366 | 31.31 |
| 19 | 22.43 | −62.0826 | (VARIABLE) | | | |
| 20 | 21.92 | −699.1085 | 1.20 | TAFD25 | 1.90366 | 31.31 |
| 21 | 21.86 | 28.2983 | 5.90 | SBSL7 | 1.51633 | 64.14 |
| 22 | 22.47 | −52.6089 | (VARIABLE) | | | |
| 23 | 22.87 | −25.8871 | 1.30 | TAFD25 | 1.90366 | 31.31 |
| 24 | 25.64 | 66.3159 | 5.75 | SBSL7 | 1.51633 | 64.14 |
| 25 | 27.70 | −48.8725 | 1.16 | | | |
| 26 | 31.74 | 214.0115 | 8.75 | SFPL51 | 1.49700 | 81.54 |
| 27 | 33.56 | −29.8524 | (VARIABLE) | | | |
| 28 | 38.70 | 88.4603 | 5.00 | SNPH1 | 1.80809 | 22.76 |
| 29 | 38.57 | −217.2189 | 5.00 | | | |
| 30 | 50.00 | INF | 37.00 | SBSL7 | 1.51633 | 64.14 |
| 31 | 50.00 | INF | 4.00 | | | |
| 32 | 50.00 | INF | 19.50 | SF6 | 1.80518 | 25.43 |
| 33 | 50.00 | INF | 6.52 | | | |

| Aspherical coefficient | | | |
|---|---|---|---|
| IMG SUR | 1* | 2* | 3* |
| R | 281.0701 | 89.9997 | 69.5903 |
| k | 0 | 0 | 0 |
| A | 3.2562E−06 | 1.5160E−07 | −2.8023E−06 |
| B | −1.3734E−09 | −1.5062E−10 | 1.0718E−09 |
| C | 7.3466E−13 | −6.6596E−14 | 5.2307E−13 |
| D | −2.4597E−16 | −5.1488E−18 | −1.2994E−15 |
| E | 4.1909E−20 | 1.3933E−20 | 7.2947E−19 |

| Zoom interval | | | |
|---|---|---|---|
| SUR | WIDE | MIDDLE | TELE |
| 11 | 73.692 | 56.695 | 40.920 |
| 13 | 1.000 | 6.781 | 13.643 |
| 15 | 15.650 | 21.913 | 27.244 |
| 16 | 10.771 | 6.785 | 1.500 |
| 19 | 2.000 | 2.000 | 4.428 |
| 22 | 3.431 | 4.256 | 4.115 |
| 27 | 1.771 | 9.887 | 16.467 |

| Focus interval | | | |
|---|---|---|---|
| SUR OBJ | 1096 | 1534 | 6576 |
| 2 | 15.167 | 15.000 | 14.604 |
| 6 | 9.949 | 9.807 | 9.523 |
| 11 | 73.550 | 73.692 | 73.976 |

Further, the numerical values in the respective exemplary embodiments and the calculation results of the respective conditional equations are as stated below.

TABLE 1

(Table of numerical values)

| Value | First exemplary embodiment | Second exemplary embodiment | Third exemplary embodiment |
|---|---|---|---|
| Focal length of G1 fg1 | −241.11 | −247.52 | −258.48 |
| Focal length of entire system ftot | 17.07 | 17.07 | 17.07 |
| Paraxial radius of G1 at enlargement side R1 | 227.88 | 246.16 | 281.07 |
| Reference radius of G1 at enlargement side SR1 | 90.27 | 98.64 | 100.90 |
| Paraxial radius of G1 at reduction side | 79.99 | 83.60 | 90.00 |
| Reference radius of G1 at reduction side SR2 | 79.99 | 90.00 | 92.41 |

TABLE 2

(Value of conditional equation)

| Conditional equation | First exemplary embodiment | Second exemplary embodiment | Third exemplary embodiment |
|---|---|---|---|
| 1.0 < \|R1/SR1\|/\|R2/SR2\| 5.0 . . . (1a) | 2.52 | 2.69 | 2.86 |
| \|R1/SR1\| > 1.0 . . . (1b) | 2.52 | 2.50 | 2.79 |
| \|R2/SR2\| < 1.0 . . . (1c) | 1.00 | 0.93 | 0.97 |
| \|fg1/ftot\| > 3 . . . (2) | 14.13 | 14.50 | 15.14 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-172277, filed Sep. 1, 2015, which is hereby incorporated by reference herein in its entirety.

What is claimed is:

1. A projection optical system comprising:
a first lens unit that moves in a direction of an optical axis in adjusting an amount of field curvature; and
a second lens unit located closer to a reduction side than the first lens unit,
wherein the first lens unit includes an aspherical lens,
when a paraxial radius of curvature of a surface of the aspherical lens at an enlargement side is denoted by R1, an effective diameter of the surface of the aspherical lens at the enlargement side is denoted by $\varphi 1$, a sagittal amount in a position at a height of $\varphi 1/2$ from the optical axis on the surface at the enlargement side is denoted by SAG1, a paraxial radius of curvature of a surface of the aspherical lens at the reduction side is denoted by R2, an effective diameter of the surface of the aspherical lens at the reduction side is denoted by $\varphi 2$, and a sagittal amount in a position at a height of $\varphi 2/2$ from the optical axis on the surface at the reduction side is denoted by SAG2, the following conditions are satisfied:

$SR1=\{(\varphi 1/2)^2+SAG1^2\}/(2\times SAG1)$ $SR2=\{(\varphi 2/2)^2+SAG2^2\}/(2\times SAG2)$ $1.0<|R1/SR1|/|R2/SR2|\leq 5.0$, and when a focal length of an entire system of the projection optical system is denoted by ftot and a paraxial focal length of the aspherical lens is denoted by fg1, the following condition is satisfied:

$3<|fg1/ftot|\leq 14.50$.

2. The projection optical system according to claim 1, wherein, the aspherical lens has a shape in which refractive power at a second position which is further away from the optical axis than a first position is smaller than refractive power at the first position.

3. The projection optical system according to claim 1, wherein the surface of the aspherical lens at the enlargement side is aspherical, and the following condition is satisfied:

$|R1/SR1|>1.0$.

4. The projection optical system according to claim 1, wherein the surface of the aspherical lens at the reduction side is aspherical, and the following condition is satisfied:

$|R2/SR2|<1.0$.

5. The projection optical system according to claim 1, wherein the aspherical lens is a meniscus lens with a convex surface facing the enlargement side.

6. The projection optical system according to claim 1, wherein the aspherical lens is located closest to the enlargement side among optical elements provided in the projection optical system.

7. The projection optical system according to claim 1, wherein the second lens unit comprises a focusing unit that moves in the direction of the optical axis, in order from the enlargement side to the reduction side in focusing, and a zooming unit that moves in the direction of the optical axis in zooming.

8. A projection type display apparatus comprising:
a light modulation element that modulates light from a light source; and
a projection optical system that guides light from the light modulation element to a projected surface
wherein the projection optical system comprises:
a first lens unit that moves in a direction of an optical axis in adjusting an amount of field curvature; and
a second lens unit located closer to a reduction side than the first lens unit,
wherein the first lens unit includes an aspherical lens,
when a paraxial radius of curvature of a surface of the aspherical lens at an enlargement side is denoted by R1, an effective diameter of the surface of the aspherical lens at the enlargement side is denoted by $\varphi 1$, a sagittal amount in a position at a height of $\varphi 1/2$ from the optical axis on the surface at the enlargement side is denoted by SAG1, a paraxial radius of curvature of a surface of the aspherical lens at the reduction side is denoted by R2, an effective diameter of the surface of the aspherical lens at the reduction side is denoted by φ2, and a sagittal amount in a position at a height of φ2/2 from the optical axis on the surface at the reduction side is denoted by SAG2, the following conditions are satisfied:

$$SR1=\{(\varphi 1/2)^2+SAG1^2\}/(2\times SAG1)$$

$$SR2=\{(\varphi 2/2)^2+SAG2^2\}/(2\times SAG2)$$

$$1.0<|R1/SR1|/|R2/SR2|\leq 5.0,\text{ and}$$

when a focal length of an entire system of the projection optical system is denoted by ftot and a paraxial focal length of the aspherical lens is denoted by fg1, the following condition is satisfied:

$$3<|fg1/ftot|\leq 14.50.$$

9. The projection type display apparatus according to claim 8, further comprising:
a position adjustment unit capable of adjusting a position of the first lens unit in the direction of the optical axis.

10. The projection type display apparatus according to claim 9, wherein the position adjustment unit adjusts a position of the first lens unit in the direction of the optical axis based on information from a position detection unit that detects a position of at least one of a zooming unit and a focusing unit in the direction of the optical axis.

11. The projection type display apparatus according to claim 9, wherein the position adjustment unit adjusts a position of the first lens unit in the direction of the optical axis based on information from a shape measurement unit that measures the shape of the projected surface.

12. The projection type display apparatus according to claim 8, wherein the aspherical lens has a shape in which refractive power at a second position which is further away from the optical axis than a first position is smaller than refractive power at the first position.

13. The projection type display apparatus according to claim 8, wherein the surface of the aspherical lens at the enlargement side is aspherical, and the following condition is satisfied:

$$|R1/SR1|>1.0.$$

14. The projection type display apparatus according to claim 8, wherein the surface of the aspherical lens at the reduction side is aspherical, and the following condition is satisfied:

$$|R2/SR2|<1.0.$$

15. The projection type display apparatus according to claim 8, wherein the aspherical lens is a meniscus lens with a convex surface facing the enlargement side.

16. The projection type display apparatus according to claim 8, wherein the first lens unit comprises the aspherical lens, and
wherein the aspherical lens is located closest to the enlargement side among optical elements provided in the projection optical system.

17. The projection type display apparatus according to claim 8, wherein the second lens unit comprises a focusing unit that moves in the direction of the optical axis, in order from the enlargement side to the reduction side in focusing, and a zooming unit that moves in the direction of the optical axis in zooming.

18. A projection optical system comprising:
an aspherical lens that moves in a direction of an optical axis in adjusting an amount of field curvature,
wherein when a focal length of an entire system of the projection optical system is denoted by ftot and a paraxial focal length of the aspherical lens is denoted by fg1, the following condition is satisfied:

$$3<|fg1/ftot|\leq 14.50.$$

19. The projection optical system according to claim 18, further comprising:
a first lens unit that includes the aspherical lens; and
a second lens unit located closer to a reduction side than the first lens unit.

20. The projection optical system according to claim 18, wherein
when a paraxial radius of curvature of a surface of the aspherical lens at an enlargement side is denoted by R1, an effective diameter of the surface of the aspherical lens at the enlargement side is denoted by φ1, a sagittal amount in a position at a height of φ1/2 from the optical axis on the surface at the enlargement side is denoted by SAG1, a paraxial radius of curvature of a surface of the aspherical lens at a reduction side is denoted by R2, an effective diameter of the surface of the aspherical lens at the reduction side is denoted by φ2, and a sagittal amount in a position at a height of φ2/2 from the optical axis on the surface at the reduction side is denoted by SAG2, the following conditions are satisfied:

$$SR1=\{(\varphi 1/2)^2+SAG1^2\}/(2\times SAG1)$$

$$SR2=\{(\varphi 2/2)^2+SAG2^2\}/(2\times SAG2)$$

$$1.0<|R1/SR1|/|R2/SR2|\leq 5.0.$$

21. The projection optical system according to claim 18, wherein, the aspherical lens has a shape in which refractive power at a second position which is further away from the optical axis than a first position is smaller than refractive power at the first position.

22. The projection optical system according to claim 18, wherein a surface of the aspherical lens at an enlargement side is aspherical, and when a paraxial radius of curvature of the surface of the aspherical lens at the enlargement side is denoted by R1, an effective diameter of the surface of the aspherical lens at the enlargement side is denoted by φ1, and a sagittal amount in a position at a height of φ1/2 from the optical axis on the surface at the enlargement side is denoted by SAG1, the following condition is satisfied:

$$SR1=\{(\varphi 1/2)^2+SAG1^2\}/(2\times SAG1)$$

$$|R2/SR2|<1.0.$$

23. The projection optical system according to claim 18, wherein a surface of the aspherical lens at a reduction side is aspherical, and when a paraxial radius of curvature of the surface of the aspherical lens at the reduction side is denoted by R2, an effective diameter of the surface of the aspherical lens at the reduction side is denoted by φ2, and a sagittal amount in a position at a height of φ2/2 from the optical axis on the surface at the reduction side is denoted by SAG2, the following condition is satisfied:

$$SR2=\{(\varphi 2/2)^2+SAG2^2\}/(2\times SAG2)$$

$$|R2/SR2|<1.0.$$

24. The projection optical system according to claim 18, wherein the aspherical lens is a meniscus lens with a convex surface facing an enlargement side.

25. The projection optical system according to claim 18, wherein the aspherical lens is located closest to an enlargement side among optical elements provided in the projection optical system.

26. The projection optical system according to claim 19, wherein the second lens unit comprises a focusing unit that moves in the direction of the optical axis, in order from an enlargement side to a reduction side in focusing, and a zooming unit that moves in the direction of the optical axis in zooming.

27. A projection type display apparatus comprising:
a light modulation element that modulates light from a light source; and
a projection optical system that guides light from the light modulation element to a projected surface
wherein the projection optical system comprises:
an aspherical lens that moves in a direction of an optical axis in adjusting an amount of field curvature,
wherein when a focal length of an entire system of the projection optical system is denoted by ftot and a paraxial focal length of the aspherical lens is denoted by fg1, the following condition is satisfied:

$3<|fg1/ftot|\leq14.50$.

28. The projection type display apparatus according to claim 27, wherein the projection optical system further comprises:
a first lens unit that includes the aspherical lens; and
a second lens unit located closer to a reduction side than the first lens unit.

29. The projection type display apparatus according to claim 27, wherein
when a paraxial radius of curvature of a surface of the aspherical lens at an enlargement side is denoted by R1, an effective diameter of the surface of the aspherical lens at the enlargement side is denoted by φ1, a sagittal amount in a position at a height of φ1/2 from the optical axis on the surface at the enlargement side is denoted by SAG1, a paraxial radius of curvature of a surface of the aspherical lens at a reduction side is denoted by R2, an effective diameter of the surface of the aspherical lens at the reduction side is denoted by φ2, and a sagittal amount in a position at a height of φ2/2 from the optical axis on the surface at the reduction side is denoted by SAG2, the following conditions are satisfied:

$SR1=\{(\varphi1/2)^2+SAG1^2\}/(2\times SAG1)$ $SR2=\{(\varphi2/2)^2+SAG2^2\}/(2\times SAG2)$ $1.0<|R1/SR1|/|R2/SR2|\leq5.0$.

30. The projection type display apparatus according to claim 28, further comprising:
a position adjustment unit capable of adjusting a position of the first lens unit in the direction of the optical axis.

31. The projection type display apparatus according to claim 30, wherein the position adjustment unit adjusts a position of the first lens unit in the direction of the optical axis based on information from a position detection unit that detects a position of at least one of a zooming unit and a focusing unit in the direction of the optical axis.

32. The projection type display apparatus according to claim 30, wherein the position adjustment unit adjusts a position of the first lens unit in the direction of the optical axis based on information from a shape measurement unit that measures the shape of the projected surface.

33. The projection type display apparatus according to claim 27, wherein the aspherical lens has a shape in which refractive power at a second position which is further away from the optical axis than a first position is smaller than refractive power at the first position.

34. The projection type display apparatus according to claim 27, wherein the surface of the aspherical lens at the enlargement side is aspherical, and when a paraxial radius of curvature of a surface of the aspherical lens at an enlargement side is denoted by R1, an effective diameter of the surface of the aspherical lens at the enlargement side is denoted by φ1, and a sagittal amount in a position at a height of φ1/2 from the optical axis on the surface at the enlargement side is denoted by SAG1, the following condition is satisfied:

$SR1=\{(\varphi1/2)^2+SAG1^2\}/(2\times SAG1)$ $|R2/SR2|<1.0$.

35. The projection type display apparatus according to claim 27, wherein the surface of the aspherical lens at the reduction side is aspherical, and when a paraxial radius of curvature of a surface of the aspherical lens at a reduction side is denoted by R2, an effective diameter of the surface of the aspherical lens at the reduction side is denoted by φ2, and a sagittal amount in a position at a height of φ2/2 from the optical axis on the surface at the reduction side is denoted by SAG2, the following condition is satisfied:

$SR2=\{(\varphi2/2)^2+SAG2^2\}/(2\times SAG2)$ $|R2/SR2|<1.0$.

36. The projection type display apparatus according to claim 27, wherein the aspherical lens is a meniscus lens with a convex surface facing an enlargement side.

37. The projection type display apparatus according to claim 27, wherein the aspherical lens is located closest to an enlargement side among optical elements provided in the projection optical system.

38. The projection type display apparatus according to claim 28, wherein the second lens unit comprises a focusing unit that moves in the direction of the optical axis, in order from an enlargement side to a reduction side in focusing, and a zooming unit that moves in the direction of the optical axis in zooming.

* * * * *